Feb. 16, 1960 — R. E. PRISTO — 2,924,927
OPERATING MECHANISM FOR CRUSHING ROLLS
Filed March 16, 1959
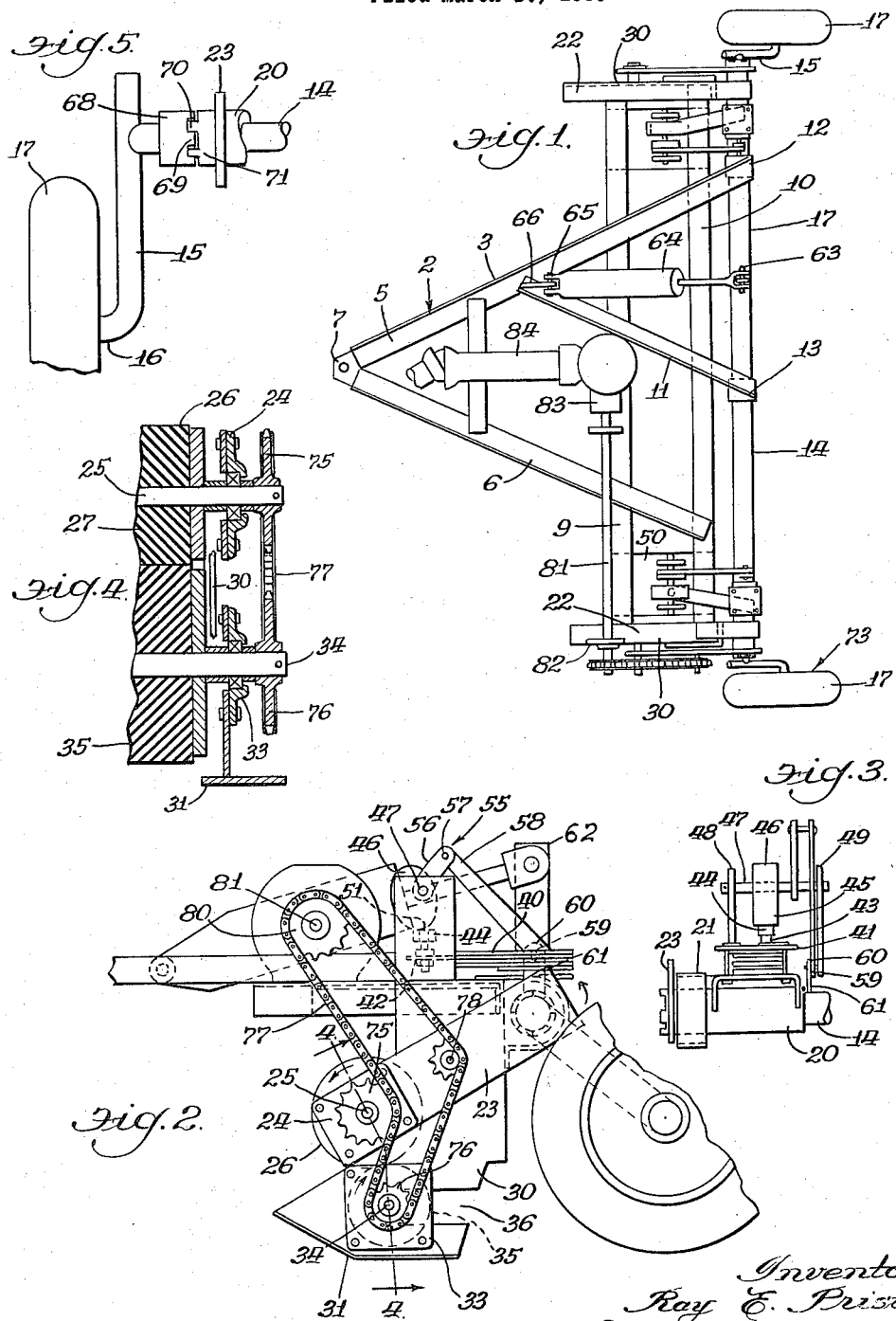
Inventor:
Ray E. Pristo United States Patent Office 2,924,927
Patented Feb. 16, 1960

2,924,927
OPERATING MECHANISM FOR CRUSHING ROLLS

Ray E. Pristo, Cicero, Ill., assignor to International Harvester Company, Chicago, Ill., a corporation of New Jersey Application March 16, 1959, Serial No. 799,631

11 Claims. (Cl. 56—1)

This invention relates to a crushing device and more specifically to a novel linkage and mechanism for controlling separation and engagement of the crushing rolls.

The general object of the invention is to provide a novel mechanism incorporating certain linkages having a novel leverage arrangement for compounding pressures in the crushing rolls.

A more specific object of the invention is to provide a novel mechanism for operating the crushing rolls such that when the machine is disposed in transport position, that is raised off the ground, the crushing rolls are automatically separated and when positioned in operating position the rolls are closed.

A still further object of the invention is to provide a novel linkage for operating the crushing rolls which incorporates a leaf spring loading means operating through a novel cam arrangement for loading the rolls.

These and other objects of the invention will become more apparent from the specification and the drawings, wherein:

Fig. 1 is a top plan view of a hay crusher incorporating the invention;

Fig. 2 is an enlarged fragmentary side elevational view of the structure shown in Fig. 1;

Fig. 3 is a fragmentary rear view;

Fig. 4 is an enlarged sectional view taken substantially on the line 4—4 of Fig. 2; and Fig. 5 is an enlarged fragmentary rear view of the wheel mounting assembly.

Describing the invention in detail and having particular reference to the drawings, there is shown a main frame generally designated 2 which comprises an A-frame structure 3 having forwardly convergent side beams 5 and 6 connected to a hitch plate 7 which is adapted for connection to an associated tractive unit such as a tractor. The frame members 5 and 6 are interconnected intermediate their ends to a forward transverse frame member 9 and adjacent to their rear ends to a rear transverse member 10.

The rear end of the member 5 as well as an additional frame member 11 which is connected to the member 5 and extends rearwardly from intermediate the end of member 5 in rearwardly diverging relationship thereto are provided with bearings 12 and 13 which rotatably mount a rock-tube 14, said tube 14 being connected at its ends to downwardly and rearwardly extending arms 15 which are provided with a generally horizontal outwardly extending pintle portions 16 which mount supporting wheels 17.

The rockshaft 14 mounts a sleeve 20 adjacent to each end, the sleeve 20 being rotatably mounted in a bearing 21 which is connected to and extends rearwardly from an adjacent side frame member 22 which interconnects the front and rear beam members 9 and 10 of the main framework. Outwardly of the bearing 21 the sleeve 20 is connected to an arm 23 which extends diagonally downwardly and forwardly and on the forward end of which rotatably mounts bearing 24 for the center shaft 25 of the upper crushing roll 26 in which preferably is formed a body 27 of elastic or resilient material. As will be readily seen in Fig. 2, the upper roll 26 is swingable vertically about the axis of the rockshaft 14 and the arms 23 are disposed outwardly of the depending side structures 30 which are in the form of thick sheet steel paneling and dependent from and connected to the side members 22, 22 of the main frame structure.

It will be noted that the side members 30 terminate at their lower ends in rearwardly and forwardly inclined bottom shoe portions 31 and that adjacent to their lower ends they support bearings 33 which mount a center shaft 34 of a lower crushing roll 35, the shaft 34 being entrable through a rearwardly open slot 36 for support on the bearings from the side members 30.

It will be seen that the lower crushing rolls when in engaged position are disposed as shown in Fig. 2, the upper roll being slightly forwardly of the bottom roll and at the same time the support wheels being swung behind the machine so that in effect the machine is lowered to an operating position.

A feature of the present invention is the novel biasing or operating mechanism for the crushing rolls which comprises a leaf spring stack 40 clamped as by clamp structure 41 to the sleeve 20. The spring stack 40 projects forwardly and is angled diagonally inwardly and at its forward extremity 42 is provided with an adjusting mechanism in the form of a bolt and nut structure 43 which has a head 44 engaging with the cam profile 45 of a cam 46 which is eccentrically mounted on the shaft 47 and which provides a generally horizontal axis of rotation for cam 46, the shaft 47 being rotatably mounted at opposite ends in supports 48 and 49 which are suitably anchored at the lower ends to a plate 50 which forms part of the framework.

It will be seen that in the operating position as shown in Fig. 2 the high point 51 of the cam engages the head 44 and thus provides a maximum loading and downward deflection of the cantilever spring assembly 40 tending to rotate the sleeve 20 and parts associated thereto in a counterclockwise direction as seen in Fig. 2. Under these circumstances the crushing rolls are closed in maximum crushing engagement.

The control linkage for determining the load on the cantilever spring assembly 40 is generally designated 55 and comprises a lever arm 56 which at its lower end is connected to the cam-shaft 47 which mounts the aforesaid cam 46. The lever 56 extends diagonally upwardly and rearwardly and at its upper end is pivoted as at 57 to the upper forward end of a rod member 58 which extends diagonally downwardly and rearwardly and is connected at its lower end as at 59 to the upper end 60 of a lever arm 61 which is fixedly connected at its lower end to the shaft or rock-member 14. It will be seen that member 14 is provided intermediate its ends with an upstanding rock-arm 62 which is pivoted at its upper ends 63 to the rear end of a hydraulic ram unit 64 which at its forward end is pivoted at 65 to the frame structure 2.

It will be seen that rockshaft 14 is provided adjacent its ends with a jaw clutch 68 which is provided with a series of teeth 69 interdigitating with teeth 70 of a jaw clutch 71 which is formed on the outer ends of the respective sleeve members 20. Thus it will be seen that the linkage 55 as well as the position of the supporting wheel and axle assembly generally designated 73 is coordinated in that upon the crusher being raised in the transport position the cam is rotated to a point where it is ineffectual substantially to load the cantilever springs 40 so that the springs 40 are free. At the same time the lowering of the unit to operating position rotates the rockshaft 14 in a counterclockwise position as shown by the arrow in Fig. 2 whereupon the teeth 69 engage the teeth 70 on the sleeve 20 thus rotating the sleeve 20 in a counterclockwise direction of Fig. 2 thus moving or advancing the lever arm 61 to the left and simultaneously moving the member 58 upwardly and forwardly or to the left and also rotating the arm 56 and the cam 46 in a counterclockwise direction thus moving the high point 51 on the cam over the head 44 on the forward end of the spring assembly 40 thereby loading the spring 40. It will be noted that the teeth 69 and 70 are loosely spaced so that in normal position the ram 64 can be operated to control the height of the unit by moving the wheels down partially without actuating the cam actuating mechanism 55 inasmuch as in its final position the cam 46 is slightly beyond dead center and will not normally deflect back when the load on the clutch 71 is released. To place the unit in transport position the ram is extended and parts will operate in a reverse direction to that heretofore described. In other words the rockshaft 14 will rotate in a clockwise direction and through the clutches 68 and 71 and the arm 23 will be raised thus disengaging the roll 26 from the roll 35 and simultaneously the operating linkage 55 would move so that the arm 61 will swing rearwardly, the link 58 would move downwardly and rearwardly and the arm 56 and cam 46 would rotate clockwise thus relieving the load on the spring assembly 40. Thus it will be seen that in the transport position the load is substantially diminished so that the ram does not have to fight the spring when it is in its extended and that in its weakest position the load is materially decreased.

It will be seen that the shafts 25 and 34 are provided with sprockets 75 and 76 and driven by chain 77 which is so wrapped about the sprockets as to drive the rolls in the direction of the arrows as shown in Figure 2.

It will be seen that the shafts 25 and 34 are provided with sprockets 75 and 76 and driven by chain 77 which is so wrapped about the sprockets as to drive the rolls in the direction of the arrows as shown in Fig. 2. Idler 78 is provided for tightening the chain, the chain being driven by a sprocket 80 which is carried on a countershaft 81 carried by bearing 82 and terminating in gear box 83 which is provided a gear train driven by a forwardly extending power take-off shaft structure 84 which is suitably supported on the frame 2.

What is claimed is:

1. In a hay conditioner having a main frame including a pair of horizontally spaced apart supports; roll-mounting and adjusting mechanism, comprising a first horizontal roll journalled at opposite ends on the supports; a second roll closely paralleling the first roll and having opposite ends respectively adjacent the supports; a pair of arms respectively adjacent to the supports, each arm having one end journalling the adjacent end of the second roll; a rockshaft rotatably mounted on the support, wheel means mounted from the rockshaft for supporting the hay conditioner, and lost-motion connection between the rockshaft and the other end of each arm; biasing means operatively associated with each arm; and linkage between said biasing means and the respective arms for loading said biasing means attendant to said arms being swung in a direction engaging said second roll with the first and unloading said biasing means upon reverse movement of the arms.

2. The invention according to claim 1 and said linkage comprising an adjustable reaction element for said biasing means.

3. The invention according to claim 1 and said linkage including cam means disposed in reaction transmitting relation to said biasing means and movable by said linkage to load said biasing means in the closed position of the rolls and unload said biasing means in the open position of the rolls.

4. The invention according to claim 1 and said biasing means comprising a leaf spring means mounted at one end on the said other ends of the arms and at their other end reactively associated with said linkage.

5. In a hay conditioner having a main frame having front and rear sides and including a pair of horizontally spaced apart supports; a transverse horizontal rockshaft rotatably mounted on the main frame on the rear side thereof; roll mounting and adjusting mechanism comprising a first horizontal roll journalled at opposite ends on the supports; a second roll closely paralleling the first roll and having opposite ends respectively adjacent the supports; a pair of fore and aft extending carriers respectively adjacent to the supports, each carrier having a forward end journalling the adjacent end of the second roll, and a rear end pivotally mounted upon respective ends of the rockshaft, wheel means including arms connected to and depending from the ends of the rockshaft and the arms having lower ends and wheels mounted on the lower ends of the arms, lost-motion means operatively interconnecting the rockshaft and arms, a ram operatively connected between the rockshaft and framework for rotating the former and swinging said wheel means, spring means reactively associated with said carriers and linkage operatively connected to the rockshaft and reactively associated with said spring means.

6. The invention according to claim 5 and said spring means comprising cantilever spring assemblies having rear ends anchored respectively to the rear ends of respective carriers and having forward ends, and said linkage operative between the rockshaft and said forward ends of the spring assemblies.

7. The invention according to claim 6 and said linkage including cam means rotatably mounted on the framework and having high and low points and rotatable to a position engaging the high point with the springs and deflecting the respective assemblies to load the carriers coincidental with engagement of the second roll with the first and reversely rotatable to a position engaging the low point with the spring assembly for unloading it coincidental with the rolls being disposed in open position.

8. In a hay conditioner having a main frame including a pair of horizontally spaced apart supports; roll mounting and adjusting mechanism, comprising a first horizontal roll journalled at opposite ends on the supports; a second roll closely paralleling the first roll and having opposite ends respectively adjacent the supports; a pair of carriers journalling the second roll respectively at its opposite ends; means mounting the carriers respectively on the supports for movement in first and second opposite directions to carry the second roll respectively toward and away from the first roll; a pair of biasing means acting respectively on the carriers, each biasing means comprising a leaf spring connected at one end to the associated carrier, a bracket mounted on the framework adjacent to each spring, a cam pivoted on each bracket and having high and low points, means for supporting the conditioner from the ground comprising a transverse shaft rotatably mounted on the framework and arms with wheels thereon mounted on the shaft means operatively interconnecting the shaft with the carriers for conjunctive movement, a linkage operatively connected between the shaft and each cam for translating movement of the shaft to the cams and rotating the cams to engage the high points thereof with respective springs upon the wheels being lowered and the rolls engaged and rotating the cams to engage their low points with respective springs upon the conditioner being raised and the rolls separated, and operating means for rotating said shaft.

9. The invention according to claim 8 and each said linkage including an arm connected to the shaft and having a free end, an arm connected to the cam and having a free end, and a rod interconnecting the free ends of said arms.

10. In a hay conditioner having a main frame including a pair of horizontally spaced apart supports; roll mounting and adjusting mechanism, comprising a first horizontal roll journalled at opposite ends on the supports; a second roll closely paralleling the first roll and having opposite ends respectively adjacent to the supports, a pair of fore and aft extending carriers respectively adjacent to the supports, each carrier having a forward end journalling the adjacent end of the second roll and having a rear end, a rockshaft rotatably mounted on the support and journalling the carriers at their rear ends, an upright arm having an upper end connected to each end of the support and having a lower end, a wheel mounted on the lower end of each arm, a leaf spring having a rear end connected to the rear end of each carrier and extending forwardly therefrom and terminating in a forward extremity, a frame mounted bracket with a cam straddling the forward extremity of each spring, said cam having high and low portions selectively presentable to the spring, said high portion serving to compress and load the spring between the cam and the associated carrier for biasing the latter to swing in a direction engaging the second roll with the first, said low portion, upon swinging of the cam, serving to unload the spring to free the carrier for swinging in a release direction, a linkage operatively interconnecting the rockshaft with the cam, and lost-motion means operatively connecting the rear end of each carrier with the rockshaft.

11. The invention according to claim 10 and adjustable abutment means between the cam and the spring.

No references cited.